United States Patent [19]

Nickel et al.

[11] Patent Number: 5,007,235
[45] Date of Patent: Apr. 16, 1991

[54] TINE TUBE BEARING ASSEMBLY FOR A HARVESTING REEL

[75] Inventors: Dwight E. Nickel, Newton; Michael L. O'Halloran, Hesston; Cecil L. Case, Newton, all of Kans.

[73] Assignee: Hay & Forage Industries, Hesston, Kans.

[21] Appl. No.: 534,833

[22] Filed: Jun. 7, 1990

[51] Int. Cl.$^5$ ............................................. A01D 57/03
[52] U.S. Cl. ..................................... 56/12.4; 56/16.4; 56/220; 384/281; 384/438
[58] Field of Search ........................ 56/12.4, 16.4, 167, 56/168, 220; 384/275, 281, 282, 296, 438, 428, 416, 157

[56] References Cited

U.S. PATENT DOCUMENTS

| | | | |
|---|---|---|---|
| 2,335,112 | 11/1943 | Fulks | 384/275 |
| 2,430,734 | 11/1947 | Raney et al. | 56/12.4 |
| 3,698,166 | 10/1972 | Fisher | 56/220 |
| 3,751,888 | 8/1973 | James | 56/12.4 |
| 4,068,454 | 1/1978 | Webb | 56/220 |
| 4,173,262 | 11/1979 | Adee | 384/157 |
| 4,653,344 | 3/1987 | Nelson | 384/281 |

FOREIGN PATENT DOCUMENTS 2172484 9/1986 United Kingdom .................. 56/220

*Primary Examiner*—Bruce M. Kisliuk
*Attorney, Agent, or Firm*—Hovey, Williams, Timmons & Collins

[57] ABSTRACT

The bearing assembly includes a synthetic resinous collar which circumscribes the tube and oscillates therewith against the inside of a metal bushing wedged within a metal housing that is bolted to the adjacent tine tube carrier arm of the reel. The bushing is constructed from a pair of generally semicircular half-sections that are abutted together to make a complete annulus when held within the housing, thereby permitting removal of the bushing from the tube by simply separating the two half-sections from one another after the housing has been slipped axially off the end of the bushing. A slit in one side of the collar permits opposed wall portions thereof to be spread apart so that the collar may likewise be removed from the tube in a transverse direction rather than requiring axial movement along the tube which would be obstructed by crop-engaging tines of the reel.

17 Claims, 3 Drawing Sheets

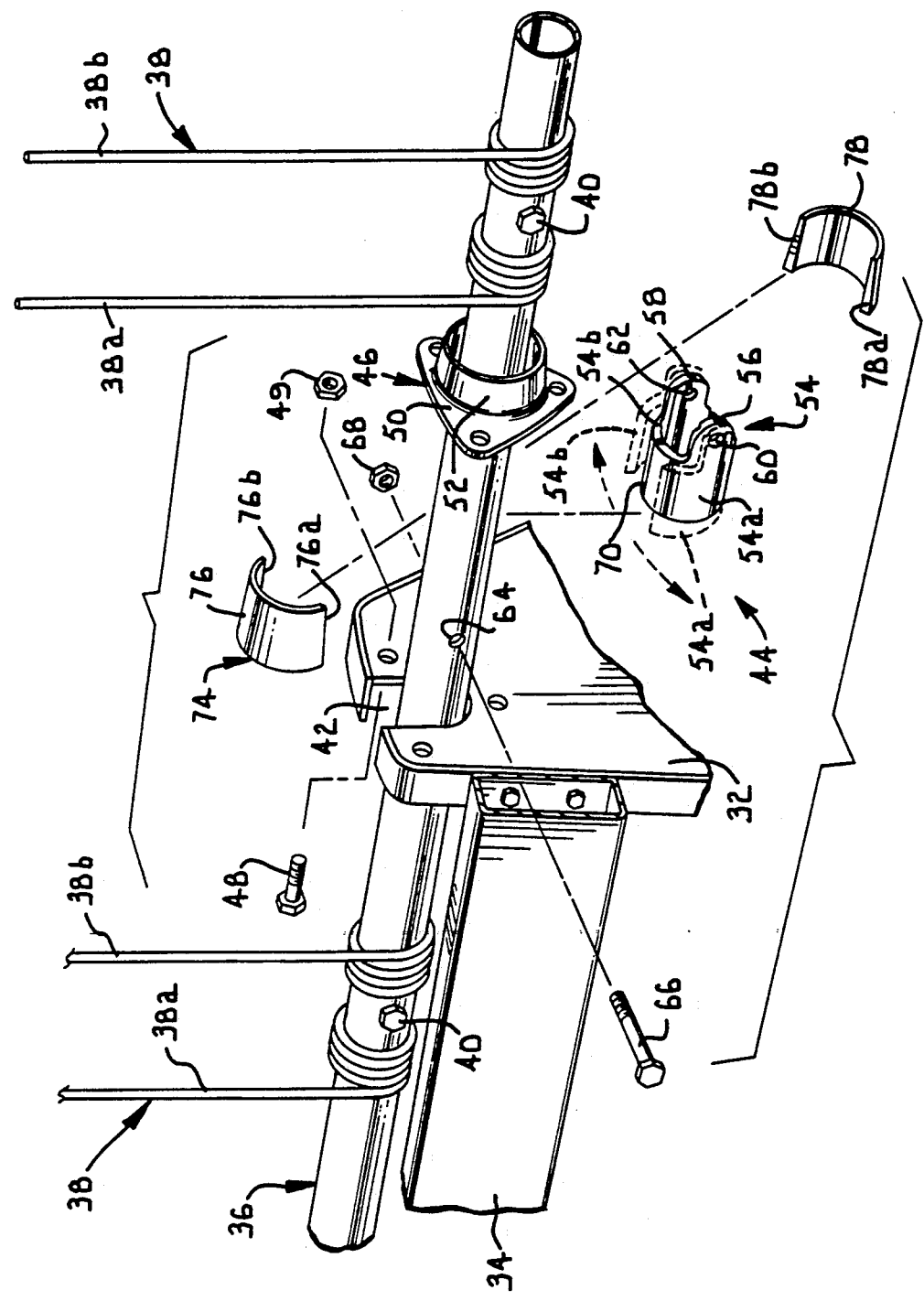

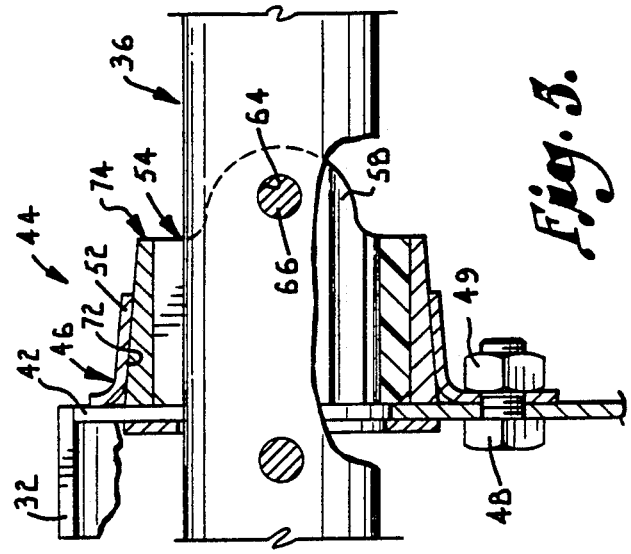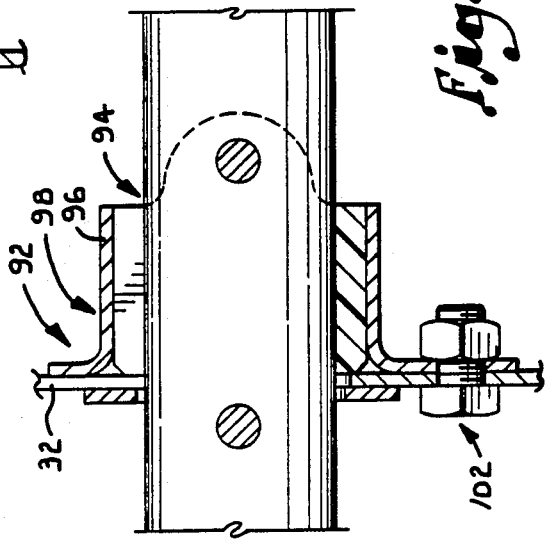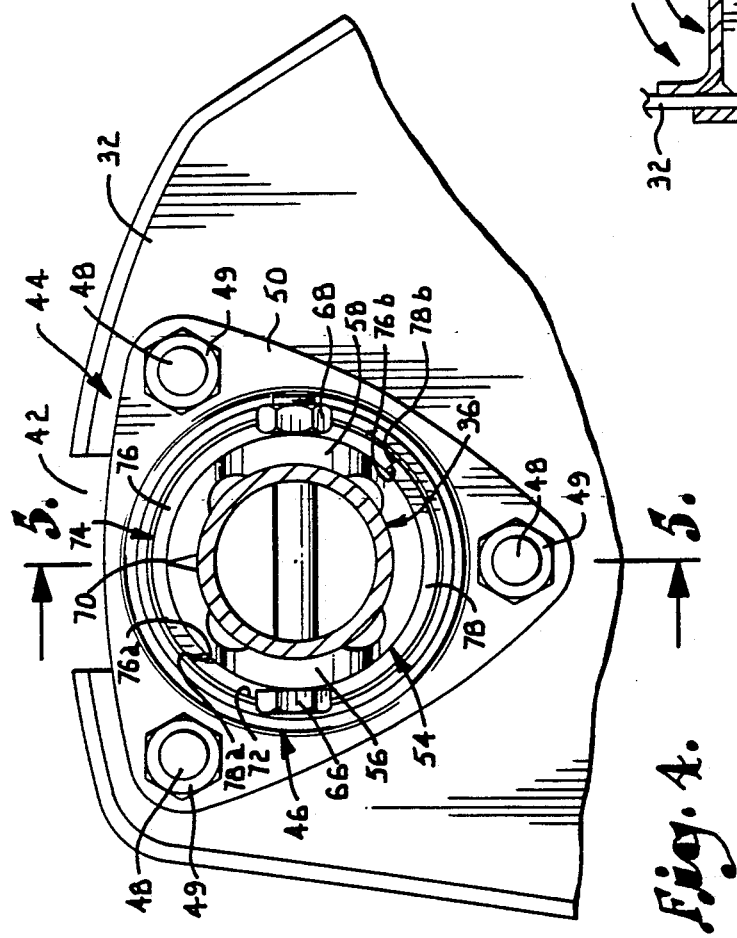

TINE TUBE BEARING ASSEMBLY FOR A HARVESTING REEL

BACKGROUND OF THE INVENTION

1. Field of the Invention

This invention relates to harvesting reels used on haying equipment, such as mower/conditioners and windrowers and, more particularly, relates to an improved, easily replaceable bearing assembly used at a number of locations on such reels to journal the tine bars of the reel for cam-operated oscillation during operation of the reel.

2. Description of the Prior Art

Hay harvesting machines variously known as mower/conditioners and windrowers have typically utilized rotary reels on the header of such machines to sweep through the standing crop as the machine advances and help place it in proper, fully upstanding position for severance by a reciprocating sickle or other cutter means below the reel. Finger-like tines of the reel comb through the standing crop to facilitate the presentation of the crop to the sickle and to then sweep the severed materials rearwardly into conditioner rolls or augers.

Such tines are typically arranged in rows that extend the width of the header and that are spaced circumferentially about the periphery of the reel. Each row of the tines is carried by a common tine bar or tube that is journaled by supporting framework of the reel for oscillating movement about the longitudinal axis of the tine bar as the wheel rotates. A cam at the end of the reel causes the oscillatory movement of the tine bars whereby to position the tines in their most advantageous angular attitudes as they sweep into the crop and then rearwardly up and through the severed material. Generally speaking, the tines project out radially from the axis of rotation of the reel as they sweep downwardly into the standing crop material at the front of the reel and thence back across the sickle, but then the tines are rocked downwardly and rearwardly out of their radial attitudes to lift or strip out of the materials in a generally vertical direction on the upsweep side of the reel so as to cleanly release the severed crop materials.

The reel framework is provided with bearing assemblies that journal the tine bars for oscillation. From time-to-time such bearings wear out and must be replaced. In prior arrangements, replacement of even one of the bearings along the length of a tine bar required complete removal of the entire tine bar from the reel and disassembly of all of the tines themselves from the bar so as to permit the worn, cylindrical housing for the bearing to be unbolted from the frame and slipped down along the length of the bar and off the end. Replacement housings then needed to be correspondingly slipped onto the end of the tine bar and moved along its length, whereupon the tines themselves were then reattached to the bar to place the assembly back in operating condition.

Although prior bearing assemblies have utilized a nylon or plastic collar which, because of a slit in its periphery, could be spread apart and transversely snapped onto the tine bar or removed therefrom with relative ease, such plastic collar rotated within the metal bearing housing and, as a consequence, frequently wore the housing itself in addition to the plastic collar. Accordingly, replacement of the collar alone was not adequate since a significant amount of wear would also be incurred by the housing, necessitating the complete disassembling of the tine bar and removal from the reel, notwithstanding the easy replaceability of the spreadable bearing collar itself.

Summary of the Present Invention

Accordingly, one important object of the present invention is to provide an improved bearing assembly construction for harvesting reel tine bars of the foregoing type in which worn parts can be quickly and easily removed and replaced without requiring removal of each tine bar itself from the reel or detachment of the numerous tine fingers.

In accordance with the foregoing, another important part of the invention is to provide an improved bearing assembly construction in which wear of the circular outer bearing housing around the tine bar is minimized so that only the more easily removed internal components are subject to significant wear, removal and replacement.

In carrying out the foregoing objects, the present invention contemplates a bearing assembly in which the housing of the assembly is bolted to the proximal carrier arm for the tine bar and always remains on the tine bar in encircling relationship therewith, even though during removal and replacement of internal bearing components the housing is temporarily unbolted from the carrier arm and left hanging on the tine bar. The parts of the assembly which are designed for periodic replacement comprise a pair of concentrically disposed, cylindrically annular components located between the tine bar and the outer housing. One of such components, a bearing collar, is attached to the tine bar for oscillation with the latter, while the other component, a cylindrical bushing, is retained within the housing in stationary, wedged relationship therewith while the bearing collar slidingly rotates within the bushing. The bearing collar that oscillates with the tine bar is constructed from a suitable synthetic resinous material such as Nylon and has adequate inherent resiliency as to conveniently allow itself to be spread apart along a parting line to facilitate installation and removal onto the tine bar in a transverse direction, rather than requiring installation and removal lengthwise of the tine bar. In a somewhat similar way, the non-rotating bushing component within the housing is comprised of a pair of metallic, semi-circular half-sections that when butted together within the housing yield a completed, annular configuration to the bushing that allows it to properly journal the collar on the tube. When the housing is unbolted from the carrier arm, the bushing may be pushed out of the housing axially, permitting the two half-sections to be separated from one another and removed transversely from the tine bar without obstruction from the adjacent tines on the bar.

BRIEF DESCRIPTION OF THE DRAWINGS

FIG. 3 is a fragmentary, exploded view of a portion of the harvesting reel illustrating the relationship between parts of a typical bearing assembly in accordance with the present invention;

FIG. 4 is an enlarged, fragmentary, transverse cross-sectional view through one tine bar of the reel slightly outboard of the bearing assembly, revealing details of construction;

FIG. 5 is a fragmentary, longitudinal cross-sectional view the bearing assembly of FIG. 4 and taken line 5—5 of that figure; and FIG. 6 is a fragmentary, longitudinal cross-sectional view of a prior art bearing assembly.

DETAILED DESCRIPTION

Figure 1:
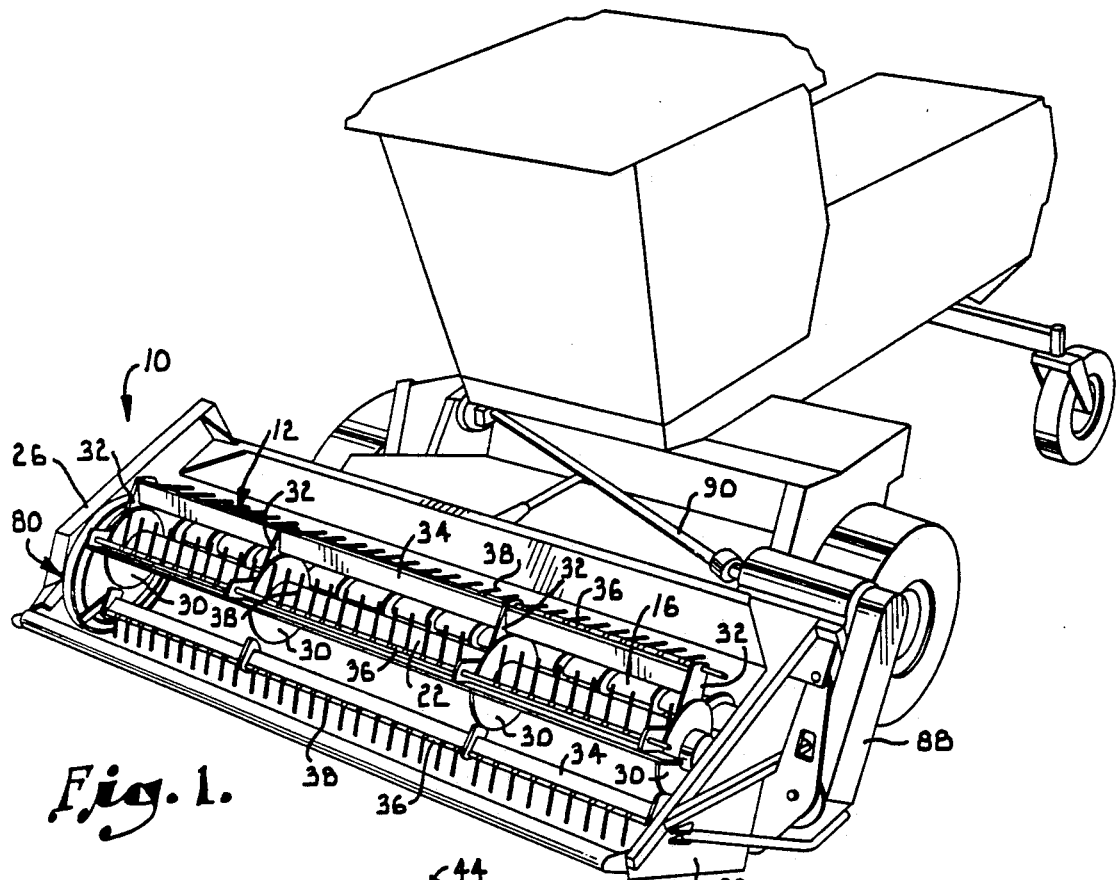
FIG. 1 is a left front perspective view of a self-propelled windrower having a harvesting reel provided with tine bar bearing assemblies constructed in accordance with the principles of the present invention.
Figure 2:
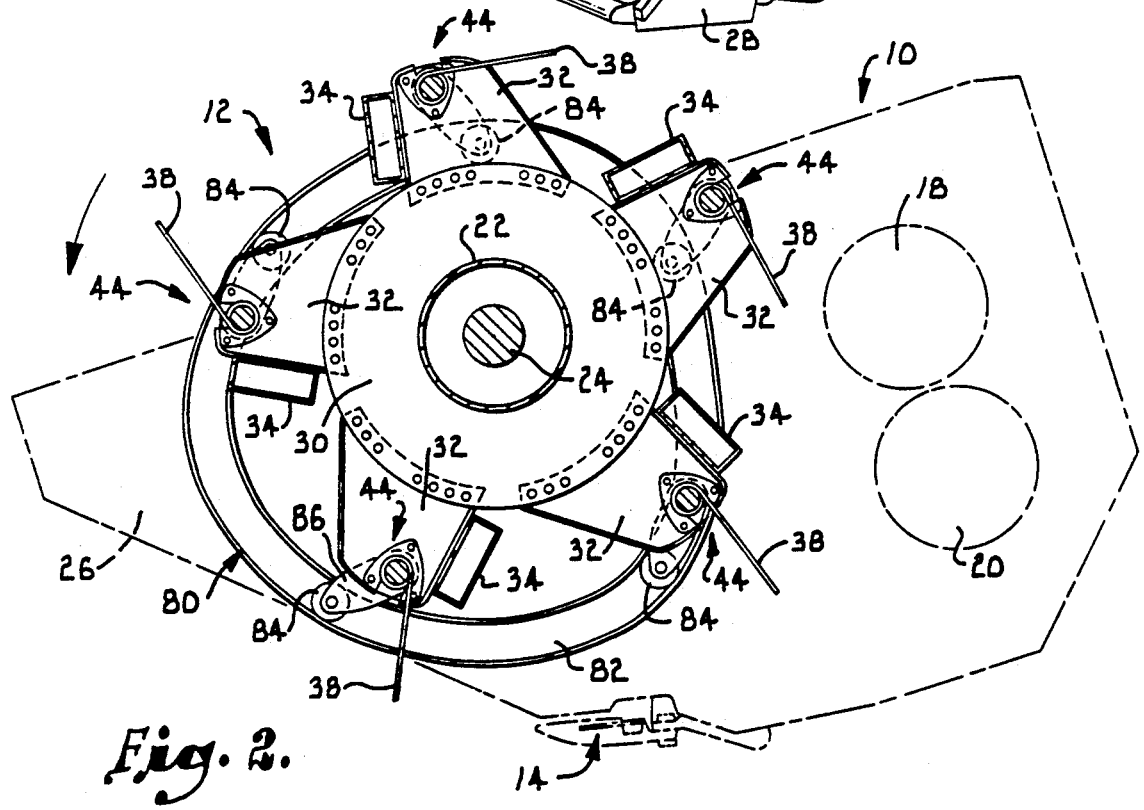
FIG. 2 is a transverse, cross-sectional view through the harvesting header of the machine in FIG. 1 illustrating the outline of the header in phantom lines, as well as locations of the conditioner rolls on the header.

FIG. 1 shows a self-propelled windrower having a header 10 that is provided with a reel 12 constructed in accordance with the principles of the present invention. The reel 12 extends across the front of the header 10 above an underlying sickle 14 as shown in FIG. 2, that also extends the full width of the header 10. As the machine operates in the field, the reel 12 rotates counterclockwise viewing FIG. 2, and sweeps the standing crop materials rearwardly against the sickle 14 where they are severed from the ground and swept upwardly and rearwardly. At that location the severed materials may be engaged and consolidated centrally by a cross-auger 16, shown only in FIG. 1, or they may be delivered directly to a pair of vertically spaced conditioner rolls 18 and 20 (FIG. 2) without first being consolidated by an auger such as the auger 16. Of course, it will be appreciated that the description of the present invention in connection with a self-propelled windrower, a header having a consolidating auger, and a header provided with conditioning rolls, is by way of example only for ease of understanding and should not be considered as limiting to the principles of the present invention which are usefully applicable in harvesting reels found on machines not having conditioner rolls, for example, or consolidating augers and the like.

The reel 12 includes a central cylindrical tube 22 having a pair of stub shafts 24 at its opposite ends (only one shaft 24 being illustrated; see FIG. 2) which are journaled by opposite end walls 26 and 28 respectively of the header 10. In the illustrated embodiment, four supporting discs 30 are fixed to the tube 22 at equally spaced locations along the latter, each disc 30 in turn being provided with five generally radially outwardly projecting carrier arms 32 fixed to the periphery of the disc 30 at circumferentially spaced locations around the latter. The arms 32 of one disc 30 are axially aligned with corresponding arms 32 of the other discs 30 so that each set of four aligned arms 32 carries a common bat 34 fixed to the leading edges of the arms in the series. Each aligned set of arms 32 also carries a tine tube or bar 36 having a series of crop-engaging tines 38 attached thereto along the length thereof. As perhaps best illustrated in FIG. 3, the tines 38 may be constructed as paired fingers 38a and 38b in FIG. 3 forming opposite ends of a single length of spring wire appropriately coiled about the tine bar 36 and secured thereto by fastening means that includes a bolt 40. Obviously, the tines 38 may take a variety of different forms as would be apparent to those ordinarily skilled in this art.

As illustrated best in FIG. 3, each tine bar 36 passes through a generally U-shaped cutout or opening 42 in the radially outer extremity of each of the carrier arms 32 in the series which support that particular tine bar 36.

Each carrier arm 32 has a bearing assembly 44 adjacent the opening 42 which journals the tine bar 36 for oscillation by a cam mechanism yet-to-be-described during rotation of the reel 12. Each bearing assembly 44 includes a housing 46 that is fixedly secured to the sidewall of the arm 32 in alignment with the opening 42 by three fastening bolts 48 passing through a triangular-shaped mounting flange 50 of the housing 46. Each bolt 48 is provided with a nut 49 that is drawn tightly against flange 50. In addition, each housing 46 comprises an annular wall 52 integral with the mounting flange 50 and projecting outwardly from the face thereof in the axial direction relative to the axis of oscillation of the tine bar 36. The wall 52 tapers in such a manner that the inner diameter thereof progressively decreases as the end of wall 52 remote from flange 50 is approached. The housing 46 is preferably constructed from a metallic substance.

The bearing assembly 44 further includes a collar 54 constructed from a synthetic resinous material such as Nylon and adapted to be secured to the tine bar 36 for oscillatory movement therewith. The collar 54, although being generally cylindrical in overall configuration, has a pair of diametrically opposed, axially extending ears 56 and 58 that are situated on opposite sides of the tine bar 36 and are provided with mounting holes 60,62 respectively (FIG. 3) aligned with corresponding transverse bolt holes 64 in the tine bar 36. A transverse bolt 66 passes through the bolt holes 64 and the mounting holes 60,62 in collar ears 56,58 so as to secure the collar 54 in place on the tine bar 36, the bolt 66 having a nut 68 on the far side of the tine bar 36 which keeps the bolt 66 releasably in place.

As perhaps illustrated best in FIG. 3, but also shown in FIG. 4, the collar 54 is provided with a slit 70 on one side thereof between the ears 56,58 which extends in the axial direction for the full length of the collar 54, thus dividing the same into a pair of wall portions 54a and 54b on opposite sides of the slit 70. The wall of the collar 54 is of such thickness and the material from which it is constructed is of such character that there is a degree of inherent resiliency inherent in the collar 54, permitting the two opposed wall portions 54a and 54b to flex toward and away from one another, as illustrated in FIG. 3. The resiliency is such that the wall portions 54a and 54b may be spread apart momentarily during installation of the collar 54 permitting the latter to be forced onto the tine bar 36 transversely as the bar 36 passes through the enlarged gap presented by the spread-apart wall portions 54a and 54b. Once on the tine bar 36, the resiliency of the wall portions 54a and 54b is such that they will return to a closed condition in which the narrow slit 70 is again presented instead of the wide mounting gap.

The collar 54 is smaller in diameter than the housing 46 and is so positioned along the length of the tine bar 36 as to have much of its length disposed within and surrounded by the wall 52 of housing 46 when the bearing assembly 44 is fully installed. Accordingly, the inside diameter of the housing wall 52 and the outside diameter of the collar 54 cooperatively define an annular region denoted by the numeral 72 in FIGS. 4 and 5. Within the region 72 is disposed the third major component of the bearing assembly 44, i.e., a specially configured bushing 74 preferably constructed from a powdered metal alloy of sufficient hardness to function as a bearing surface for the collar 54 during oscillation of the latter. The bushing 74 has the same axial length as the main wall portion of the collar 54 and is constructed in two parts, comprising a pair of half-sections 76 and 78. Each of the half-sections 76,78 has a pair of opposite, circumferentially spaced, axially extending side edges denoted by the numerals 76a and 76b in the case of half-section 76, and by the numerals 78a and 78b in the case of half-section 78. When the half-sections 76,78 are brought together with their edges 76a,78a and 76b,78b in abutting engagement, the bushing 74 takes on a complete annular configuration. Thus, when in place within the region 72 between bearing housing 46 and collar 54, the bushing 74 exhibits the overall cylindrically annular configuration illustrated in FIGS. 4 and 5.

It is to be noted that when the bearing assembly 44 is fully assembled, the bushing 74 is held tightly in place within the bearing housing 46 through a wedging action. In this respect, it will be noted that although the inside diameter of the complete annulus formed by the assembled bushing 74 is of constant dimension, the outer diameter of the bushing 74 tapers at the same rate of taper as the inside diameter of the housing wall 52. Although the normally outermost end of the bushing 74 closest to the mounting bolt 66 is slightly smaller in outside diameter than the inside diameter of the corresponding outer end of housing wall 52, the opposite, inner end of the bushing 74 is larger in diameter than the inner diameter of the outer end of the housing wall 52. Consequently, during installation as will be discussed below, when the housing 46 is slipped axially over the bearing 74 in circumscribing relationship therewith and is forced leftwardly toward the carrier arm 32, viewing FIG. 5, the housing 46 and the bearing 74 come into wedging relationship with one another so as to cause the bearing 74 to be stationarily held by the housing 46 against oscillation with the collar 54. When the bearing assembly 44 is fully installed, the inner end of the bushing 74 butts up against the proximal face of the carrier arm 32.

As illustrated in FIG. 2, oscillation of the tine bars 36 during rotation of the reel 12 is controlled by a cam mechanism located at the right end of the header 10 as viewed from the rear of the machine and broadly denoted by the reference numeral 80. Cam mechanism 80 includes a track 82 that extends a full 360° around the axis of rotation of the reel 12 but has various portions thereof disposed at differing radial distances from such axis so that track 82 is not perfectly circular. The cam mechanism 80 further includes a set of five cam following rollers 84 disposed within the track 82 and respectively carried on the outer ends of five crank arms 86 fixed to the ends of respective ones of the tine bars 36. Consequently, as the reel 12 rotates in a counterclockwise direction viewing FIG. 2, the following rollers 84 ride along within the track 82 and are caused to swing the crank arms 86 in and out relative to the axis of rotation of the reel 12 so as to oscillate the tine bars 36 and their tines 38 in the illustrated manner.

Although not illustrated in detail, it will be understood that the reel 12 is driven by suitable drive mechanism such as, for example, mechanism located at the left end of the header 10 behind the housing 88. Input power for the mechanism behind housing 88 may be obtained, for example, through a drive line 90 ultimately coupled with an output shaft (not shown) on the machine.

FIG. 6 shows a prior art bearing assembly 92 which utilizes a collar 94 identical in construction to the collar 54. However, the collar 54 in the prior art bearing assembly 92 bears directly against the annular wall 96 of a bearing housing 98, instead of against a special bushing such as the bushing 74 of FIGS. 1–5. The prior art bearing housing 98 has a mounting flange 100 similar to the flange 50 in the invention of FIGS. 1–5, such flange 100 being secured to the carrier arm 32 by bolt and nut assemblies 102 in the same manner as in the invention of FIGS. 1–5. However, the cylindrical wall 96 of bearing housing 98 is not tapered, having instead an internal diameter of constant dimension corresponding substantially to the outer diameter of the collar 54.

OPERATION

In use, each of the bearing assemblies 44 is so designed that when replacement of worn parts is required, there is no need to completely disassemble the particular tine bars 36 involved or to remove any of the tines 38. In fact, the design of each bearing assembly 44 is such that only the collar 54 and the bushing 74 are designed for replacement, it being intended that the housing 46 will remain on the tine bar 36 throughout the useful life of the reel 12.

In order to replace the collar 54 and bushing 74 of any particular bearing assembly 44 requiring such attention, the nuts 49 from the mounting bolts 48 are loosened and removed, as is the nut 68 and the bolt 66 which secures the collar 54 onto the tine bar 36. The housing 46 and bushing 74 may then be forced away from the carrier arm 32 and along the length of the tine bar 36 a sufficient distance as to provide room for the bushing 74 to be pushed out of housing 46 toward arm 32. With the housing 46 moved along the tine bar 36 and the bushing 74 disposed outside of housing 46 as illustrated, for example, in FIG. 3, the half-sections 76,78 of the bushing 74 are no longer held together, thus permitting their complete separation and removal from the tine bar 36 without further axial movement. The opposed wall portions 54a and 54b of the collar 54 may then be spread apart, allowing the collar 54 to be slipped transversely off the tine bar 36 and discarded.

With the bearing housing 46 still in its axially displaced position along the tine bar 36, as illustrated in FIG. 3, a new collar 54 may be installed on the tine bar 36 by spreading apart its portions 54a and 54b and pushing the collar 54 transversely onto the bar 36 until the latter is fully received within the interior of the collar 54 and the portions 54a,54b have flexed back into their normal, unspread positions. Then, a new bushing 74 may be installed on the collar 54 by bringing the two half-sections 76,78 transversely onto the collar 54 in circumscribing relationship therewith until edges 76a and 76b abut edges 78a and 78b. With the two half-sections 76,78 manually held together in one hand, the housing 46 may then be slipped along the tine bar 36 with the other hand until it surrounds the bushing 74. As the entire assembly is then moved leftwardly viewing FIGS. 3 and 5, for example, the inner end of the bushing 74 will come into abutting engagement with the carrier arm 32. Continued leftward movement of the housing 46 when the bushing 74 has abutted the carrier arm 32 will cause the bushing 74 to become progressively wedged within the tapered wall 52 of the housing 46, thereby firmly retaining the bushing 74 against escape in a rightward direction. The bolts 48 with their nuts 49 and the single transverse bolt 66 with its nut 68 may then be replaced, completing the procedure and once again preparing the reel for operational use.

It will be appreciated that the foregoing description of a single preferred embodiment of the invention is by way of example only and that those skilled in the art could make obvious modifications to the invention as described without departing from the principles of the invention. Accordingly, the present invention should be limited only by a fair scope of the claims which follow and not by the particular preferred embodiment hereinabove set forth.

We claim:

1. In a harvester reel having a plurality of circumferentially spaced tine bars which are oscillated about their longitudinal axes within openings in carrier arms for the bars during operative rotation of the reel, thereby changing the angle of presentation of crop-engaging tines on the bars as the bars describe a circular path of travel during rotation of the reel, an improved bearing assembly on each carrier arm for its tine bar comprising:

a generally cylindrical housing secured to the arm against rotation relative thereto and having an annular wall projecting laterally outwardly from the arm generally in the axial direction of the tine bar, said wall being axially aligned with the opening in the carrier arm and circumscribing the tine bar in radially outwardly spaced relation thereto;

a cylindrical bearing collar secured to the tine bar in surrounding relationship therewith for oscillating movement with the tine bar relative to the housing, said collar being at least partially axially received within the housing in radially spaced relation to said wall thereof to define an annular region between the wall and the collar; and a bushing retained within said region against rotary movement relative to the housing and disposed in sliding engagement with the collar of the tine bar to support the latter during its oscillation.

2. In a harvester reel as claimed in claim 1,
said bushing having an inner end abutting the carrier arm to limit axial inward movement of the bushing,
said bushing and the wall of said housing being configured to provide a mutually wedged fit therebetween for retaining the bushing against axial outward movement relative to the housing.

3. In a harvester reel as claimed in claim 1,
said bushing and the wall of said housing being configured to provide a mutually wedged fit therebetween for retaining the bushing against axial outward movement relative to the housing.

4. In a harvester reel as claimed in claim 3,
the outer diameter of said bushing progressively decreasing as the outer end of the wall is approached from the carrier arm, and the inner diameter of the wall progressively decreasing as the outer end thereof is approached from the carrier arm.

5. In a harvester reel as claimed in claim 4
the inner diameter of the bushing and the outer diameter of the collar remaining substantially constant.

6. In a harvester reel as claimed in claim 4,
said bushing being comprised of a pair of at least generally semi-circular half-sections retained in a complete annular configuration when disposed within the housing and separable from one another to permit removal from the tine bar when the housing is detached from the carrier arm and the bushing is withdrawn from the housing.

7. In a harvester reel as claimed in claim 6,
said bushing sections both being constructed from a metallic substance.

8. In a harvester reel as claimed in claim 7,
said collar being constructed from a synthetic resinous material.

9. In a harvester reel as claimed in claim 8,
said collar being provided with means releasably fastening the collar to the tine bar,
said collar having an axial slit therein and being inherently sufficiently resilient as to permit opposed portions of the collar adjacent the slit to be yieldably forcibly spread apart when the fastening means is released and then returned to a normal unspread condition whereby to permit removal from and replacement onto the tine bar transversely thereof.

10. In a harvester reel as claimed in claim 9,
said bushing having an inner end abutting the carrier arm to limit axial inward movement of the bushing.

11. In a harvester reel as claimed in claim 1,
said bushing being comprised of a pair of at least generally semi-circular half-sections retained in a complete annular configuration when disposed within the housing and separable from one another to permit removal from the tine bar when the housing is detached from the carrier arm and the bushing is withdrawn from the housing.

12. In a harvester reel as claimed in claim 11,
said bushing sections both being constructed from metal.

13. In a harvester reel as claimed in claim 12,
said collar being constructed from a resinous material.

14. In a harvester reel as claimed in claim 13,
said bushing and the wall of said housing being configured to provide a mutually wedged fit therebetween for retaining the bushing against axial outward movement relative to the housing.

15. A replaceable bearing component for a tine bar bearing assembly of a harvester reel wherein the assembly includes a collar secured to the tine bar for rotation therewith and a housing having an annular, axially tapering wall that rotationally receives the tine bar and the collar in radially outwardly spaced relationship to the collar, said component comprising:

a pair of separate, generally semi-circular half-sections each having a pair of opposite, circumferentially spaced, axially extending side edges disposed for abutting engagement with corresponding side edges of the other half-section to render the component generally cylindrically annular in overall configuration when the half-sections are brought together, said half-sections being of such thicknesses as to cause the component to occupy the annular space between the collar and the housing wall when the assembly is installed whereby to provide a bearing surface for the collar to slide against during rotary movement of the tine bar, the radially outer surfaces of the half-sections being so configured as to render the component externally diametrically tapering at a rate corresponding to that of the housing wall whereby to permit the component to be retainingly yet removably wedged within the housing when the assembly is installed on the reel.

16. A replaceable bearing component as claimed in claim 15,
said half-sections being constructed from metal.

17. A replaceable bearing component as claimed in claim 16,
said half-sections having radially inner surfaces configured to provide an inner surface of constant diameter for the component when the half-sections are brought together.

* * * * *